US009434581B2

(12) United States Patent
Miki

(10) Patent No.: US 9,434,581 B2
(45) Date of Patent: Sep. 6, 2016

(54) SLOW STOPPING APPARATUS FOR WORKING MACHINE

(71) Applicant: TADANO LTD., Kagawa (JP)

(72) Inventor: Toshihiko Miki, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 14/441,604

(22) PCT Filed: Nov. 12, 2013

(86) PCT No.: PCT/JP2013/006637
§ 371 (c)(1),
(2) Date: May 8, 2015

(87) PCT Pub. No.: WO2014/076935
PCT Pub. Date: May 22, 2014

(65) Prior Publication Data

US 2015/0291399 A1 Oct. 15, 2015

(30) Foreign Application Priority Data

Nov. 19, 2012 (JP) ................................ 2012-252828

(51) Int. Cl.
*G06F 7/00* (2006.01)
*B66C 13/06* (2006.01)
*B66C 23/70* (2006.01)
*B66F 11/04* (2006.01)
*B66F 17/00* (2006.01)

(52) U.S. Cl.
CPC ........... *B66C 13/063* (2013.01); *B66C 23/705* (2013.01); *B66F 11/046* (2013.01); *B66F 17/006* (2013.01)

(58) Field of Classification Search
None
See application file for complete search history.

(56) References Cited

U.S. PATENT DOCUMENTS 4,932,541 A * 6/1990 Belsterling ............. B66C 13/02 212/271
2014/0107971 A1* 4/2014 Engedal .................. B66C 13/02 702/150

FOREIGN PATENT DOCUMENTS

JP H07-069584 A 3/1995
JP H07-330285 A 12/1995
JP H11-139771 A 5/1999

(Continued)

OTHER PUBLICATIONS

International Search Report for PCT/JP2013/006637, Feb. 18, 2014.

(Continued)

*Primary Examiner* — Yolanda Cumbess

(57) ABSTRACT

Provided is a slow stopping apparatus for a working machine which can shorten a stopping time while suppressing a cargo swing. The slow stopping apparatus includes a first slow stopper 21 which calculates a cargo swing cycle T and takes a time T1 in a half of the cargo swing cycle T to stop an actuator 10 when a stop signal is input, a second slow stopper 22 which takes a shorter time T2 than the time T1 in the half of the cargo swing cycle T to stop the actuator 10, a cargo swing predictor 23 which predicts whether a load amplitude A would exceed an allowable value, and a switcher 24 which switches the first slow stopper 21 and the second slow stopper 22 in accordance with prediction of the cargo swing predictor 23. It is possible to suppress a cargo swing in stop of a motion of the working machine, thereby shortening a time required for stopping the motion of the working machine.

10 Claims, 5 Drawing Sheets

(56) References Cited

FOREIGN PATENT DOCUMENTS

| | | |
|---|---|---|
| JP | 2000-103596 A | 4/2000 |
| JP | 2004-161460 A | 6/2004 |

OTHER PUBLICATIONS

Written Opinion of the International Searching Authority for PCT/JP2013/006637, Feb. 18, 2014.

* cited by examiner

SLOW STOPPING APPARATUS FOR WORKING MACHINE

TECHNICAL FIELD

The present invention relates to a slow stopping apparatus for a working machine. More specifically, the present invention relates to a slow stopping apparatus for a working machine which serves to suppress a cargo swing when stopping a motion of a working machine having a boom such as an aerial work platform or a crane.

BACKGROUND ART

As a slow stopping apparatus for a working machine, there is known an apparatus for braking a motion speed of a boom at a constant acceleration to stop the working machine when a motion of the boom is stopped suddenly by an operating lever (for example, Patent Document 1). By reducing a speed at a constant acceleration, it is possible to slowly stop the boom, thereby suppressing a cargo swing.

However, the conventional slow stopping apparatus does not take a flexure of the boom into consideration. For this reason, there is a problem in that the boom is flexed in the stop of the motion of the boom and a cargo swing is caused by the flexure in a specific posture of the boom, particularly, a state in which the boom is extended.

On the other hand, Patent Document 2 discloses the technique for calculating a cargo swing cycle time in consideration of the flexure of the boom and braking a motion speed of the boom in a cargo swing cycle time at a constant acceleration, thereby carrying out stop. By the technique, it is possible to suppress a cargo swing including the flexure of the boom when stopping the motion of the boom.

It is known that an amount of the flexure of the boom is proportional to an acceleration and a mass (a weight) of a cargo supported by the boom. In more detail, the flexure of the boom can approximate to that of a cantilever and an amount δ of the flexure of the cantilever is expressed in the following Equation 1.

$$\delta = \frac{Fl^3}{3EI} \quad \text{[Equation 1]}$$

wherein F represents a force to be applied in a perpendicular direction to a free end of a cantilever, I represents a length of the cantilever, E represents a Young's modulus of the cantilever, and I represents a secondary cross-sectional moment of the cantilever. In other words, the amount δ of the flexure is proportional to the force F to be applied to the cantilever. In the case of a flexure generated when the motion of the boom is stopped suddenly, the force F is an inertial force (F=ma) of the cargo supported on the boom. For this reason, the amount of the flexure of the boom is proportional to an acceleration a and a mass m of the cargo supported on the boom.

In the case in which the motion of the boom is stopped suddenly, the acceleration of the boom is increased with a rise in a motion speed just before a sudden stop, resulting in an increase in the acceleration of the cargo on the assumption that the motion speed is 0 within a constant time regardless of the motion speed of the boom. For this reason, the amount of the flexure of the boom is proportional to the motion speed just before a sudden stop. In other words, in the case in which the motion speed of the boom is high, the sudden stop causes the flexure of the boom to be increased, resulting in an increase in a load amplitude. On the other hand, in the case in which the motion speed of the boom is low, the sudden stop causes the amount of the flexure of the boom to be reduced, resulting in a decrease in the load amplitude. On the other hand, the cargo swing cycle time does not depend on the motion speed of the boom.

Referring to the technique described in the Patent Document 2, the cargo swing cycle time is taken to carry out stop regardless of the motion speed of the boom. For this reason, there is a problem in that a time required for the stop is increased also in the case in which the motion speed of the boom is low and the cargo swing does not matter.

PRIOR ART DOCUMENT

Patent Document

[Patent Document 1] Japanese Laid-Open Patent Publication No. 2000-103596

[Patent Document 2] Japanese Laid-Open Patent Publication No. Hei 7-69584

SUMMARY OF THE INVENTION

Problems to be Solved by the Invention

In consideration of the circumstances, it is an object of the present invention to provide a slow stopping apparatus for a working machine which can shorten a time required for stop while suppressing a cargo swing.

Means for Solving the Problem

A slow stopping apparatus for a working machine according to a first invention is provided in the working machine having a boom which supports a cargo and includes an actuator which operates the working machine, a control unit which controls a driving motion of the actuator and an operating unit which gives an instruction to operate the working machine to the control unit, and the control unit includes a first slow stopper which calculates a cargo swing cycle of the cargo and takes a time in a half of the cargo swing cycle to brake and stop the actuator when a stop signal for giving an instruction to stop a motion of the working machine is input from the operating unit, a second slow stopper which takes a shorter time than the time in the half of the cargo swing cycle to brake and stop the actuator when the stop signal is input from the operating unit, a cargo swing predictor which predicts whether a load amplitude of the cargo would exceed an allowable value, and a switcher which stops the actuator by the first slow stopper when the cargo swing predictor predicts that the load amplitude of the cargo would exceed the allowable value and stops the actuator by the second slow stopper when the cargo swing predictor predicts that the load amplitude of the cargo would not exceed the allowable value.

In the first invention, the slow stopping apparatus for a working machine according to a second invention features that the first slow stopper calculates a cargo swing cycle of the cargo based on a posture of the boom and a weight of the cargo and takes a time in a half of the cargo swing cycle to brake and stop the actuator when a stop signal for giving an instruction to stop a motion of the boom is input from the operating unit.

In the first invention, the slow stopping apparatus for a working machine according to a third invention features that the working machine includes a hook suspended from the boom for hanging the cargo thereon, and the first slow stopper calculates a cargo swing cycle of the cargo based on a posture of the boom, a suspension distance of the hook and a weight of the cargo and takes a time in a half of the cargo swing cycle to brake and stop the actuator when a stop signal for giving an instruction to stop a motion of the boom is input from the operating unit.

In the first invention, the slow stopping apparatus for a working machine according to a fourth invention features that the working machine includes a hook suspended from the boom for hanging the cargo thereon, and the first slow stopper calculates a cargo swing cycle of the cargo based on a posture of the boom and a weight of the cargo and takes a time in a half of the cargo swing cycle to brake and stop the actuator when a stop signal for giving an instruction to stop the motion of the hook is input from the operating unit.

In the first or second invention, the slow stopping apparatus for a working machine according to a fifth invention features that the cargo swing predictor calculates a load amplitude of the cargo based on a posture of the boom, a motion speed of the boom and a weight of the cargo, and decides that the load amplitude of the cargo would exceed an allowable value when the load amplitude exceeds a threshold and decides that the load amplitude of the cargo would not exceed the allowable value when the load amplitude does not exceed the threshold.

In the first or third invention, the slow stopping apparatus for a working machine according to a sixth invention features that the working machine includes a hook suspended from the boom for hanging the cargo thereon, and the cargo swing predictor calculates a load amplitude of the cargo based on a posture of the boom, a suspension distance of the hook, a motion speed of the boom and a weight of the cargo, and decides that the load amplitude of the cargo would exceed an allowable value when the load amplitude exceeds a threshold and decides that the load amplitude of the cargo would not exceed the allowable value when the load amplitude does not exceed the threshold.

In the first or fourth invention, the slow stopping apparatus for a working machine according to a seventh invention features that the working machine includes a hook suspended from the boom for hanging the cargo thereon, and the cargo swing predictor calculates a load amplitude of the cargo based on a posture of the boom, a motion speed of the hook and a weight of the cargo, and decides that the load amplitude of the cargo would exceed an allowable value when the load amplitude exceeds a threshold and decides that the load amplitude of the cargo would not exceed the allowable value when the load amplitude does not exceed the threshold.

In the first, second, third or fourth invention, the slow stopping apparatus for a working machine according to an eighth invention features that there is provided a speed detector for detecting a motion speed of the working machine, and the cargo swing predictor decides that the load amplitude of the cargo would exceed the allowable value when a result of detection of the speed detector exceeds a threshold, and decides that the load amplitude of the cargo would not exceed the allowable value when the result of the detection of the speed detector does not exceed the threshold.

In the first, second, third or fourth invention, the slow stopping apparatus for a working machine according to a ninth invention features that there is provided a posture detector for detecting a posture of the boom, and the cargo swing predictor decides that the load amplitude of the cargo would exceed the allowable value when a result of detection of the posture detector exceeds a threshold, and decides that the load amplitude of the cargo would not exceed the allowable value when the result of the detection of the posture detector does not exceed the threshold.

In the first, second, third or fourth invention, the slow stopping apparatus for a working machine according to a tenth invention features that there is provided a weight detector which detects a weight of the cargo, and the cargo swing predictor decides that the load amplitude of the cargo would exceed the allowable value when a result of detection of the weight detector exceeds a threshold, and decides that the load amplitude of the cargo would not exceed the allowable value when the result of the detection of the weight detector does not exceed the threshold.

Effect of the Invention

According to the first invention, in the case in which it is predicted that the load amplitude would exceed the allowable value, the actuator is stopped by the first slow stopper. Therefore, it is possible to suppress the cargo swing when stopping the motion of the working machine. In the case in which it is predicted that the load amplitude would not exceed the allowable value, the actuator is stopped by the second slow stopper. Therefore, it is possible to shorten a time required for stopping the motion of the working machine. In addition, it is possible to control the load amplitude within an allowable range. Therefore, it is possible to shorten a stopping time while suppressing the cargo swing.

According to the second invention, in the case in which the motion of the boom is stopped, the cargo swing cycle is calculated based on the posture of the boom and the weight of the cargo. Therefore, it is possible to accurately predict the cargo swing cycle, thereby suppressing the cargo swing sufficiently.

According to the third invention, in the case in which the motion of the boom having the hook is stopped, the cargo swing cycle is calculated based on the posture of the boom, the suspension distance of the hook and the weight of the cargo. Therefore, it is possible to accurately predict the cargo swing cycle, thereby suppressing the cargo swing sufficiently.

According to the fourth invention, in the case in which the motion of the hook is stopped, the cargo swing cycle is calculated based on the posture of the boom and the weight of the cargo. Therefore, it is possible to accurately predict the cargo swing cycle, thereby suppressing the cargo swing sufficiently.

According to the fifth invention, in the case in which the motion of the boom is stopped, the load amplitude is calculated based on the posture of the boom, the motion speed of the boom and the weight of the cargo and it is predicted whether the allowable value would be exceeded based on the load amplitude. Therefore, it is possible to accurately predict the cargo swing, thereby switching the first slow stopper and the second slow stopper properly.

According to the sixth invention, in the case in which the motion of the boom having the hook is stopped, the load amplitude is calculated based on the posture of the boom, the suspension distance of the hook, the motion speed of the boom and the weight of the cargo and it is predicted whether the allowable value would be exceeded based on the load amplitude. Therefore, it is possible to accurately predict the cargo swing, thereby switching the first slow stopper and the second slow stopper properly.

According to the seventh invention, in the case in which the motion of the hook is stopped, the load amplitude is calculated based on the posture of the boom, the motion speed of the hook and the weight of the cargo and it is predicted whether the allowable value would be exceeded based on the load amplitude. Therefore, it is possible to accurately predict the cargo swing, thereby switching the first slow stopper and the second slow stopper properly.

According to the eighth invention, the result of the detection of the speed detector is compared with the threshold. Consequently, it is predicted whether the load amplitude would exceed the allowable value. Therefore, the first slow stopper and the second slow stopper are switched based on the motion speed of the boom or the hook. Consequently, a worker can predict which slow stopper stops the boom or hook. Thus, operability can be improved.

According to the ninth invention, the result of the detection of the posture detector is compared with the threshold. Consequently, it is predicted whether the load amplitude would exceed the allowable value. Therefore, the first slow stopper and the second slow stopper are switched based on the posture of the boom. Consequently, the worker can predict which slow stopper stops the boom or hook. Thus, the operability can be improved.

According to the tenth invention, the result of the detection of the weight detector is compared with the threshold. Consequently, it is predicted whether the load amplitude would exceed the allowable value. Therefore, the first slow stopper and the second slow stopper are switched based on the weight of the cargo. Consequently, the worker can predict which slow stopper stops the boom or hook. Thus, the operability can be improved.

MODE FOR CARRYING OUT THE INVENTION

Next, embodiments according to the present invention will be described with reference to the drawings.

A slow stopping apparatus for a working machine according to the present invention is provided in all working machines having a boom which supports a cargo, for example, an aerial work platform, a crane or the like, and is used for suppressing a cargo swing in stop of a motion of the working machine. Description will be given by taking, as an example, the case of an aerial work platform and a mobile crane.

First Embodiment

A slow stopping apparatus 1 according to a first embodiment of the present invention is provided in an aerial work platform. First of all, a basic structure of an aerial work platform 100 will be described with reference to FIG. 3.

Figure 3:
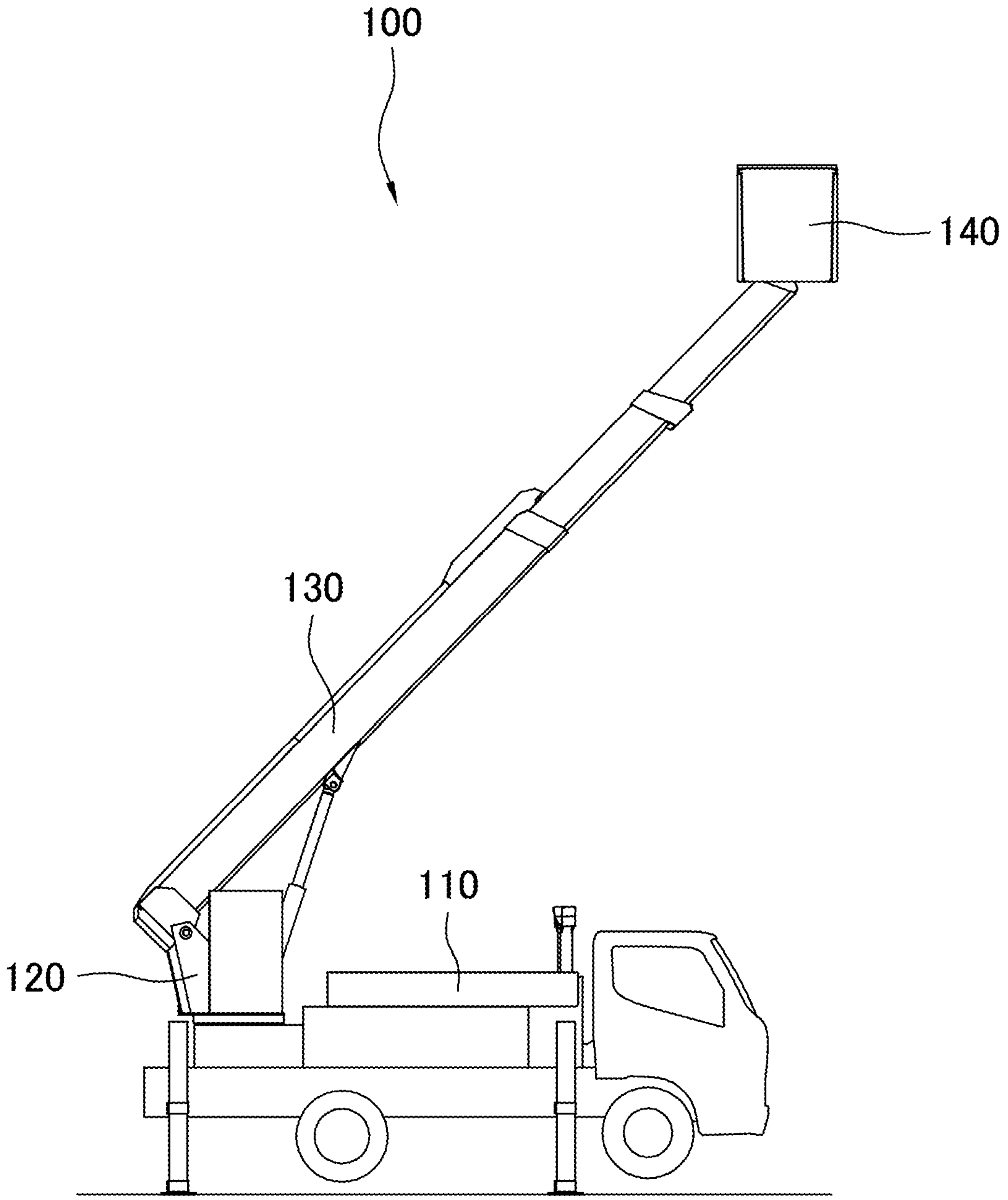
FIG. 3 is a side view showing an aerial work platform.

In FIG. 3, the reference numeral 110 denotes a vehicle, and a slewing table 120 is mounted in a rear part of a cargo bed of a vehicle 110. A turning motion of the slewing table 120 is carried out by a turning motor. A multistage boom 130 is attached to the slewing table 120 so as to be freely derricked. An expanding/contracting motion of the boom 130 is carried out by an expanding/contracting cylinder and a derricking motion is carried out by a derricking cylinder. A tip of the boom 130 is provided with a basket-shaped bucket 140 on which a worker can get. The bucket 140 is always maintained horizontally regardless of a change in a derricking angle of the boom 130 and can be turned in a horizontal plane.

When the boom 130 is turned in the aerial work platform 100 and the turning motion is stopped suddenly, the boom 130 is flexed by an inertial force of the bucket 140 so that the bucket 140 is swung in a horizontal direction by the flexure. When the boom 130 is derricked and the derricking motion is stopped suddenly, moreover, the boom 130 is flexed by the inertial force of the bucket 140 so that the bucket 140 is swung in a perpendicular direction by the flexure.

The slow stopping apparatus 1 according to the present embodiment is used for suppressing the swing of the bucket 140 when stopping the turning or derricking motion of the boom 130 in the aerial work platform 100.

In the aerial work platform 100, the "cargo" described in claims means the bucket 140 provided on the tip of the boom 130 and a loaded object such as a worker that is loaded on the bucket 140 (which will be hereinafter referred to as the "bucket 140"). The "weight of a cargo" means a weight of the bucket 140 including the loaded object (which will be hereinafter referred to as the "weight of the bucket 140"), and the "cargo swing" means a swing of the bucket 140.

Next, the structure of the slow stopping apparatus 1 will be described.

Figure 1:
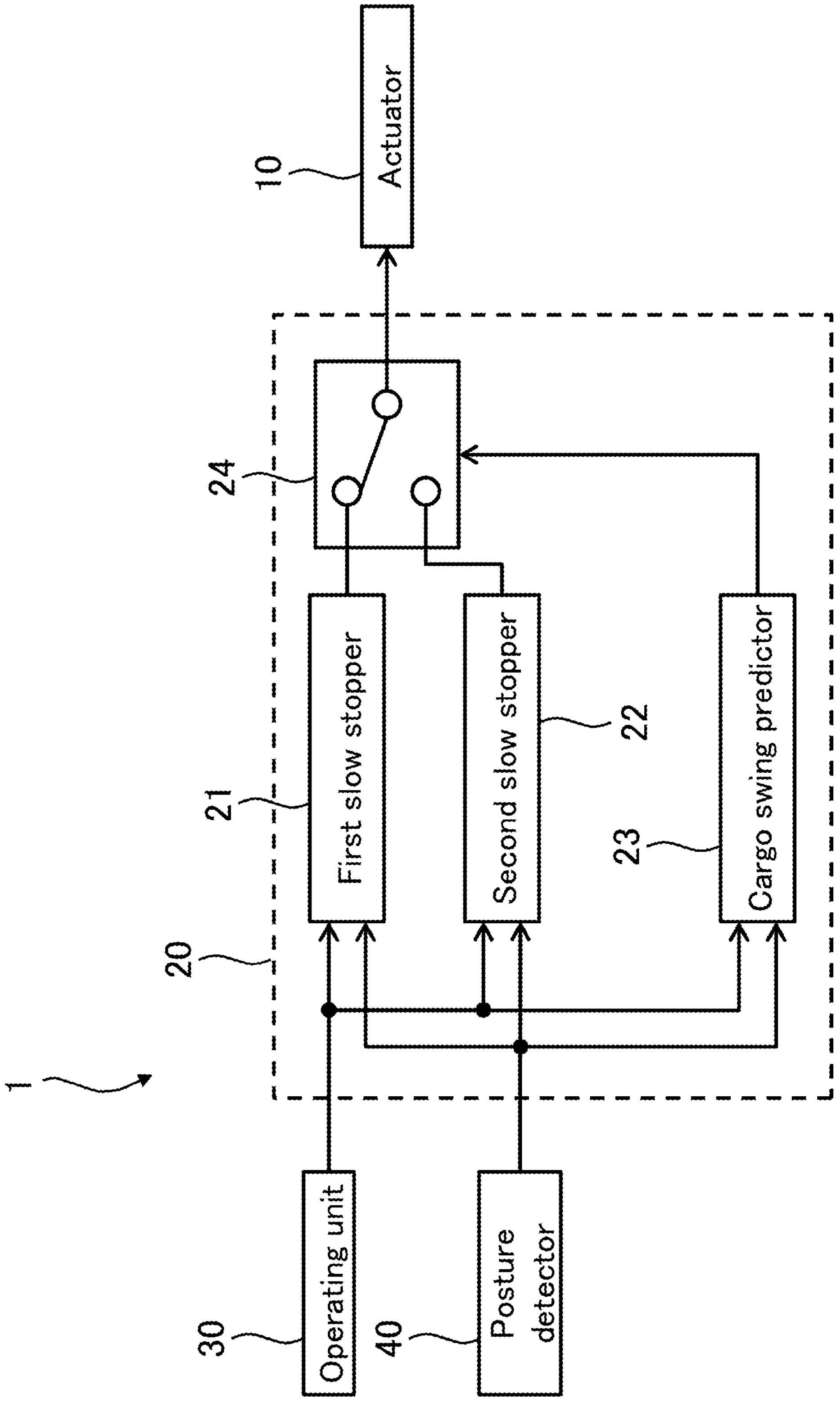
FIG. 1 is a block diagram showing a slow stopping apparatus according to a first embodiment of the present invention.

As shown in FIG. 1, the slow stopping apparatus 1 includes an actuator 10 which operates the aerial work platform 100, a control unit 20 which controls a driving motion of the actuator 10, an operating unit 30 which gives an instruction to operate the aerial work platform 100 to the control unit 20, and a posture detector 40 which detects a posture of the boom 130.

In the present embodiment, the actuator 10 is a turning motor for turning the boom 130 or a derricking cylinder for derricking the boom 130.

The control unit 20 is an on-vehicle computer configured from a CPU, a memory and the like and is a unit for controlling the driving motion of the actuator 10 in accordance with the instruction given by the operating unit 30. In general, the actuator 10 of the aerial work platform 100 is a hydraulic actuator and a hydraulic circuit for supplying hydraulic oil to the hydraulic actuator is connected to the hydraulic actuator. The control unit 20 switches a valve forming the hydraulic circuit or the like to control a direction or a flow rate of the hydraulic oil to be supplied to the actuator 10, thereby controlling a driving direction or a driving speed of the actuator 10.

The operating unit 30 includes an operating lever, an operating pedal, a switch and the like which are provided in the vehicle 110 and the bucket 140 in the aerial work platform 100. The control unit 20 controls the driving speed of the actuator 10 in accordance with an operating amount (an amount of inclination of the operating lever) of the operating unit 30. More specifically, when the operating amount of the operating unit 30 is increased, the actuator 10 is controlled to have the driving speed increased so that the turning speed or derricking speed of the boom 130 is increased. When the operating amount of the operating unit 30 is reduced, moreover, the actuator 10 is controlled to have the driving speed reduced so that the turning speed of derricking speed of the boom 130 is reduced. In the case in which the operating unit 30 is not operated (the operating amount is 0), moreover, a stop signal for giving an instruction to stop the motion of the boom 130 is input from the operating unit 30 to the control unit 20.

The posture detector 40 is configured from various sensors for measuring a turning angle, a derricking angle and an expansion/contraction length, and the like. A result of the detection of the posture detector 40 is input to the control unit 20.

The control unit 20 includes first slow stopper 21, second slow stopper 22, cargo swing predictor 23, and switcher 24 and is configured to stop the actuator 10 which is being driven in their cooperation. The first slow stopper 21, the second slow stopper 22, the cargo swing predictor 23 and the switcher 24 are implemented by execution of a program through the control unit 20.

The control unit 20 has a function for driving the actuator 10 in accordance with the operating amount of the operating unit 30 in addition to the function for stopping the actuator 10, and a unit for implementing the function is omitted in FIG. 1.

Signals are input from the operating unit 30 and the posture detector 40 to the first slow stopper 21. The first slow stopper 21 stops the actuator 10 by the following slow stopping method when a stop signal for giving an instruction to stop the motion of the boom 130 is input from the operating unit 30 to the first slow stopper 21.

First of all, the first slow stopper 21 calculates a cargo swing cycle T of the bucket 140 based on the result of the detection of the posture detector 40 and the weight of the bucket 140 which is prestored when inputting the stop signal from the operating unit 30. Herein, the cargo swing cycle T represents a cycle of a natural vibration of the bucket 140 which is generated when the motion of the boom 130 is stopped suddenly. It is known that the cargo swing cycle T of the bucket 140 is uniquely determined by the posture of the boom 130 (the derricking angle and the expansion/contraction length) and the weight of the bucket 140.

The first slow stopper 20 has such a structure as to prestore information such as a dead weight, a structure or a rigidity about the boom 130 and to dynamically calculate the cargo swing cycle T based on the information, the result of the detection of the posture detector 40 (the posture of the boom 130) and the weight of the bucket 140.

Moreover, it is also possible to employ a structure in which the cargo swing cycle T for each posture of the boom 130 is previously obtained by a test and is stored in the first slow stopper 21, and the first slow stopper 21 calls the cargo swing cycle T corresponding to the result of the detection of the posture detector 40 from the cargo swing cycle T for each posture of the boom 130 which is stored.

It is also possible to employ a structure in which a weight detector for detecting the weight of the bucket 140 is provided and the cargo swing cycle T is calculated based on the results of the detection of the posture detector 40 and the weight detector. In the aerial work platform 100, however, the weight of the bucket 140 itself is constant and the weight of the loaded object such as a worker does not fluctuate greatly. For this reason, the fluctuation in the weight of the bucket 140 is small. Also with a structure in which the weight of the bucket 140 has a fixed value as in the present embodiment, therefore, the calculated cargo swing cycle T has a small error.

Figure 2:
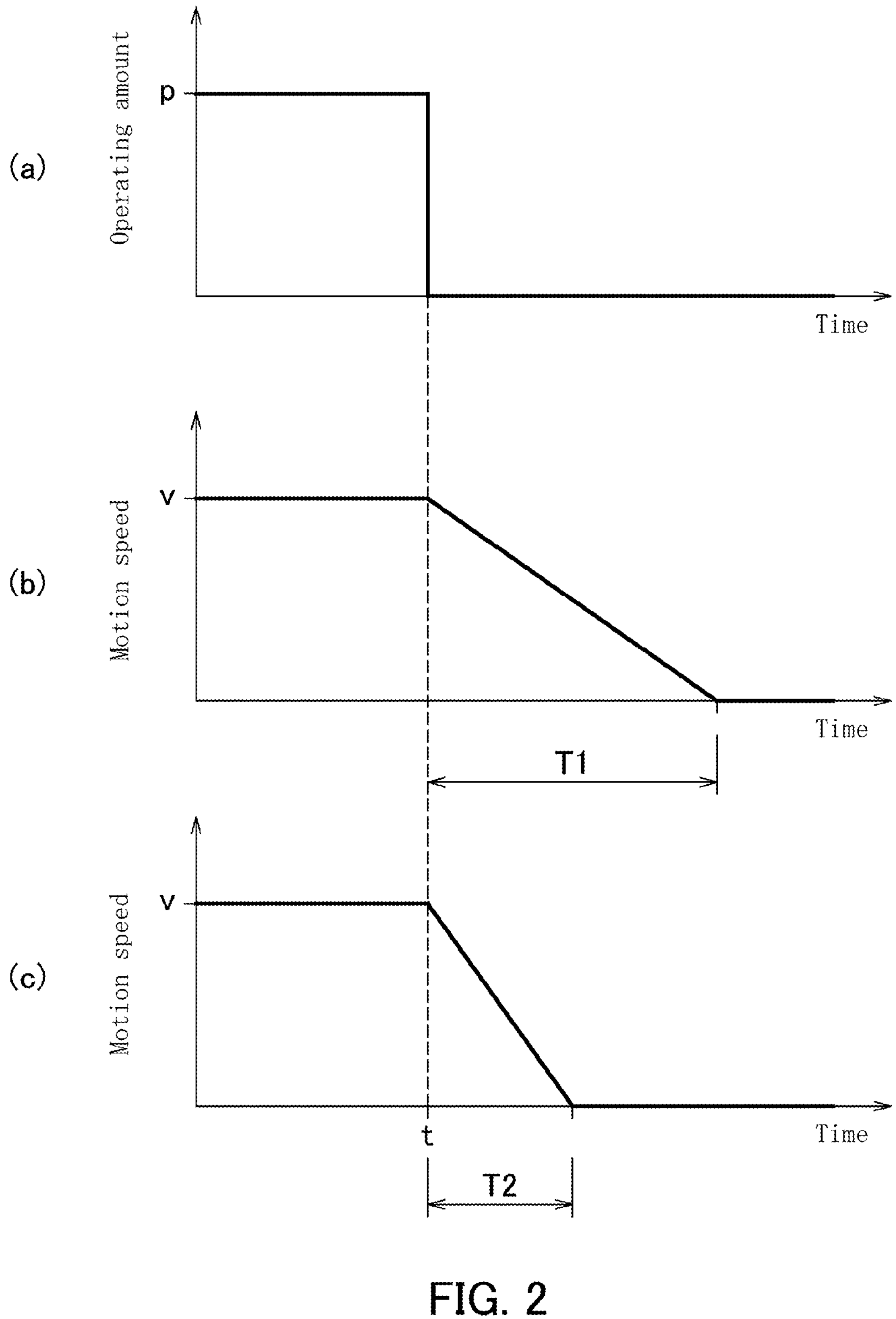
FIG. 2 (*a*) is a graph showing a time change in an operating amount of an operating unit, FIG. 2 (*b*) is a graph showing a time change in a motion speed of a boom or a hook in the case in which stop is carried out by a first slow stopper, and FIG. 2 (*c*) is a graph showing a time change in the motion speed of the boom or the hook in the case in which stop is carried out by a second slow stopper.

Next, the first slow stopper 21 outputs a control signal in order to take a time T1 (=T/2) in a half of the calculated cargo swing cycle T, thereby braking and stopping the actuator 10. In more detail, as shown in FIG. 2, it is assumed that the motion speed of the boom 130 is represented by v in the case in which the operating amount of the operating unit 30 is represented by p. In the case in which the operating amount of the operating unit 30 is changed from p to 0 (a non-operation state) at a time t (FIG. 2(*a*)), the first slow stopper 21 brakes the actuator 10 in such a manner that the motion speed of the boom 130 is 0 when the time T1 passes since the time t (FIG. 2(*b*)).

Thus, it is known that the cargo swing in the stop of the motion of the boom 130 can be suppressed by taking the time T1 in the half of the cargo swing cycle T to brake and stop the actuator 10. Although an acceleration in speed reduction is made constant in FIG. 2(*b*), it does not need to be constant.

The second slow stopper 22 inputs signals from the operating unit 30 and the posture detector 40. The second slow stopper 22 stops the actuator 10 by the following slow stopping methods when inputting the stop signal from the operating unit 30.

The second slow stopper 22 outputs a control signal in order to take a prestored time T2, thereby braking and stopping the actuator 10 when inputting the stop signal from the operating unit 30. In more detail, as shown in FIG. 2, in the case in which the operating amount of the operating unit 30 is changed from p to 0 (the non-operation state) at the time t (FIG. 2(*a*)), the second slow stopper 21 brakes the actuator 10 in such a manner that the motion speed of the boom 130 is 0 when the time T2 passes since the time t (FIG. 2(*c*)).

Herein, the time T2 is set to be shorter than the time T1 in the half of the cargo swing cycle T. For this reason, when the actuator 10 is stopped by the second slow stopper 22, the cargo swing occurs corresponding to a shorter portion than the time T1. A value of the time T2 is predetermined by a test. More specifically, times required for the stop are obtained to cause the load amplitude to fall within a predetermined range every posture of the boom 130, and are set to be the times T2. Herein, the "load amplitude" means an amplitude of the cargo swing.

The second slow stopper 22 calls the time T2 corresponding to the result of the detection of the posture detector 40 from the times T2 for postures of the boom 130 which are stored, and outputs a control signal in order to take the time T2, thereby stopping the actuator 10.

The time T2 may be determined as a constant value regardless of the posture of the boom 130. In this case, the result of the detection of the posture detector 40 is not input to the second slow stopper 22. The second slow stopper 22 outputs a control signal in order to take the prestored time T2, thereby stopping the actuator 10 regardless of the posture of the boom 130.

The cargo swing predictor 23 inputs signals from the operating unit 30 and the posture detector 40. The cargo swing predictor 23 predicts whether the load amplitude in the sudden stop of the motion of the boom 130 would exceed an allowable value based on the operating amount of the operating unit 30, the result of the detection of the posture detector 40 and the weight of the bucket 140 which is prestored. In the present embodiment, the cargo swing predictor 23 carries out prediction by the following method.

First of all, the cargo swing predictor 23 calculates a load amplitude A of the bucket 140 based on the operating amount of the operating unit 30, the result of the detection of the posture detector 40 and the weight of the bucket 140. It is known that the load amplitude A of the packet 140 is determined by the posture of the boom 130 (the derricking angle and the expansion/contraction length), the motion speed of the boom 130 and the weight of the bucket 140 (including the weight of the loaded object).

In the present embodiment, the motion speed of the boom 130 is acquired from the operating amount of the operating unit 30. More specifically, an operating amount p just before the operating amount of the operating unit 30 is 0 is set to be the motion speed of the boom 130 as shown in FIG. 2(*a*). In other words, the operating unit 30 also plays a role as the speed detector for detecting the motion speed of the boom 130 in the present embodiment.

The motion speed of the boom 130 may be calculated based on a time change in the result of the detection of the posture detector 40 (the posture of the boom 130). Moreover, a speed detector for detecting the motion speed of the boom 130 may be provided in addition to the operating unit 30. Thus, the "speed detector" described in the claims has such a concept that it is not restricted to a unit for directly detecting the motion speed of the boom 130 but includes a unit for indirectly detecting the motion speed of the boom 130, for example, the operating unit 30 or the posture detector 40.

The cargo swing predictor 23 has a structure in which information such as a structure or a rigidity about the boom 130 is prestored and the load amplitude A is dynamically calculated based on the information, the operating amount of the operating unit 30 (the motion speed of the boom 130), the result of the detection of the posture detector 40 (the posture of the boom 130) and the weight of the bucket 140.

Moreover, it is also possible to employ a structure in which the load amplitudes A for postures and motion speeds of the boom 130 are previously obtained by a test and are stored in the cargo swing predictor 23, and the cargo swing predictor 23 calls the load amplitude A corresponding to the operating amount of the operating unit 30 and the result of the detection of the posture detector 40 from the load amplitudes A for postures and motion speeds of the boom 130 which are stored.

Next, the cargo swing predictor 23 decides that the load amplitude A would exceed an allowable value when the calculated load amplitude A exceeds a prestored threshold, and decides that the load amplitude A would not exceed the allowable value when the calculated load amplitude A does not exceed the threshold.

Herein, the threshold is predetermined as an allowable maximum value of the load amplitude A. For example, the threshold is determined as a maximum value of the load amplitude A by which a worker getting on the bucket 140 does not feel uncomfortable.

The switcher 24 inputs control signals output from the first slow stopper 21 and the second slow stopper 22 respectively, and selects any of the control signals and outputs the control signal to the actuator 10. The switcher 24 is connected to the cargo swing predictor 23, and outputs the control signal of the first slow stopper 21 to the actuator 10 to stop the actuator 10 by the first slow stopper 21 when the cargo swing predictor 23 predicts that the load amplitude A would exceed the allowable value. When the cargo swing predictor 23 predicts that the load amplitude A would not exceed the allowable value, moreover, the switcher 24 outputs the control signal of the second slow stopper 22 to the actuator 10, thereby stopping the actuator 10 by the second slow stopper 22.

Next, the motion of the slow stopping apparatus 1 will be described.

As shown in FIG. 2, when the worker operates the operating unit 30 to change the operating amount of the operating unit 30 from p to 0 (the non-operation state) at the time t (FIG. 2(*a*)), the first slow stopper 21 outputs the control signal to take the time T1 in the half of the cargo swing cycle T, thereby stopping the actuator 10 (FIG. 2(*b*)). On the other hand, the second slow stopper 22 outputs the control signal to take the shorter time T2 than the time T1, thereby stopping the actuator 10 (FIG. 2(*c*)). Moreover, the cargo swing predictor 23 predicts whether the load amplitude A would exceed the allowable value based on the operating amount p of the operating unit 30 just before a sudden stop, the result of the detection of the posture detector 40 and the weight of the bucket 140.

In the case in which the expansion/contraction length of the boom 130 is great or the case in which the motion speed of the boom 130 is high, the cargo swing predictor 23 predicts that the load amplitude A would exceed the allowable value. In this case, the switcher 24 outputs the control signal of the first slow stopper 21 to the actuator 10 to stop the actuator 10 by the first slow stopper 21. For this reason, it is possible to suppress the cargo swing in the stop of the motion of the boom 130.

On the other hand, in the case in which the expansion/contraction length of the boom 130 is small or the case in which the motion speed of the boom 130 is low, the cargo swing predictor 23 predicts that the load amplitude A would not exceed the allowable value. In this case, the switcher 24 outputs the control signal of the second slow stopper 22 to the actuator 10 to stop the actuator 10 by the second slow stopper 22. For this reason, it is possible to shorten a time required for stopping the motion of the boom 130. In addition, it is predicted that the load amplitude A would not exceed the allowable value. Even if the actuator 10 is stopped by the second slow stopper 22, therefore, it is possible to control the load amplitude A to fall within an allowable range.

As described above, according to the slow stopping apparatus 1, it is possible to shorten the stopping time while suppressing the cargo swing.

Moreover, the cargo swing predictor 23 according to the present embodiment predicts the load amplitude A based on the operating amount of the operating unit 30 (the motion speed of the boom 130), the result of the detection of the posture detector 40 (the posture of the boom 130) and the weight of the bucket 140 and predicts whether the allowable value would be exceeded based on the load amplitude A in the case in which the motion of the boom 130 is stopped. Consequently, it is possible to accurately predict the cargo swing. Therefore, it is possible to properly switch the first slow stopper 21 and the second slow stopper 22, and to shorten the stopping time while suppressing the cargo swing reliably.

Second Embodiment

A slow stopping apparatus 2 according to a second embodiment of the present invention is provided in a mobile crane. First of all, a basic structure of a mobile crane 200 will be described with reference to FIG. 5.

Figure 5:
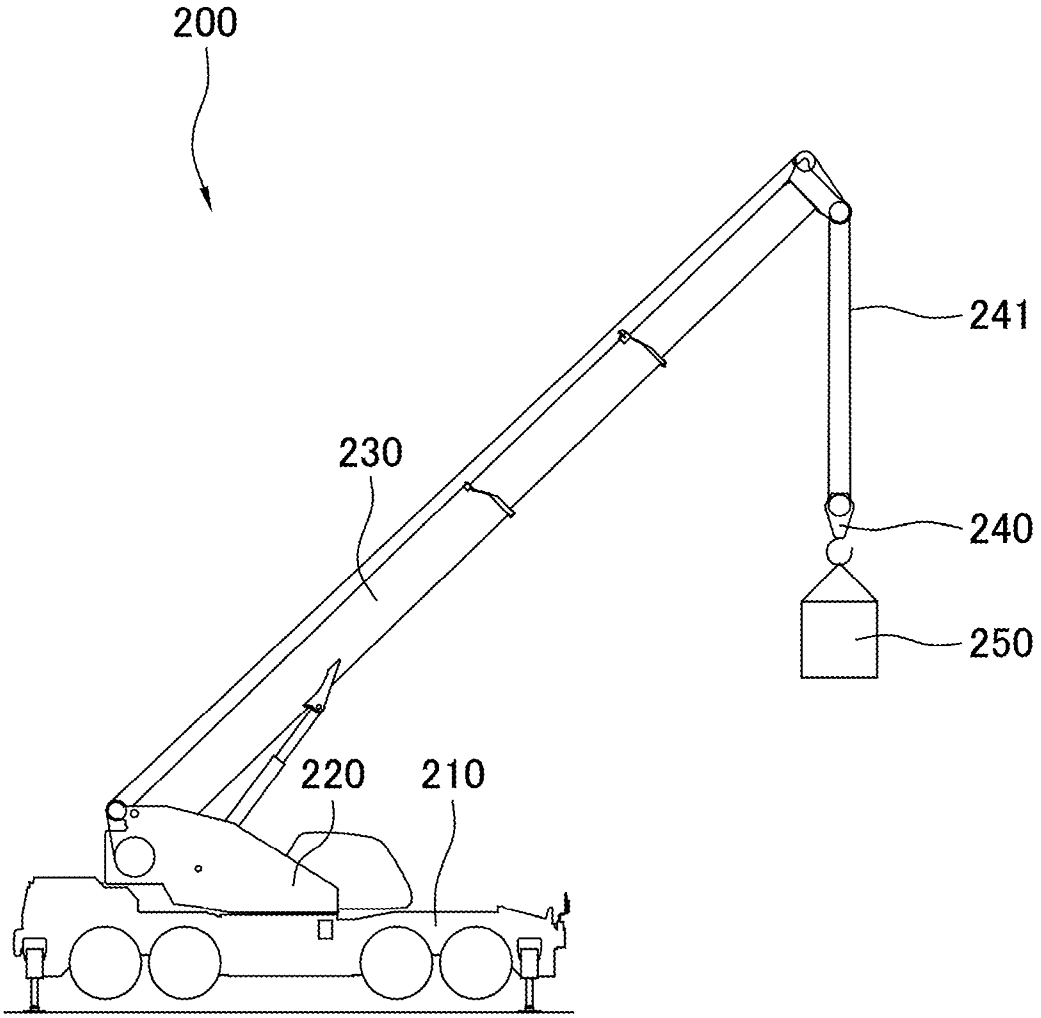
FIG. 5 is a side view showing a mobile crane.

In FIG. 5, the reference numeral 210 is a running vehicle body and a slewing table 220 is mounted on an upper surface of the running vehicle body 210. A turning motion of the slewing table 220 is carried out by a turning motor. A multistage boom 230 is attached to the slewing table 220 so as to be freely derricked. An expanding/contracting motion of the boom 230 is carried out by an expanding/contracting cylinder and a derricking motion is carried out by a derricking cylinder. A wire rope 241 including a hook 240 is suspended from a tip of the boom 230 and is led to a base of the boom 230 and is wound upon a winch. When the winch is rotated to wind the wire rope 241, thereby carrying out feeding, the hook 240 can be moved upward/downward. A suspended cargo 250 can be hung on the hook 240. By combining the turning, derricking and expanding/contracting motions of the boom 230 and the upward/downward movement of the hook 240, it is possible to move the suspended cargo 250 upward and downward in a three-dimensional space.

When the boom 230 is turned in the mobile crane 200 and the turning motion is stopped suddenly, the suspended cargo 250 is swung like a pendulum in a horizontal direction by an inertial force of the suspended cargo 250, and furthermore, the boom 230 is flexed by the inertial force of the suspended cargo 250 so that the suspended cargo 250 is swung in the horizontal direction by the flexure. Moreover, when the boom 230 is derricked and the derricking motion is stopped suddenly, the boom 230 is flexed by the inertial force of the suspended cargo 250 and the suspended cargo 250 is swung in a perpendicular direction by the flexure, and furthermore, the suspended cargo 250 is swung like a pendulum in the horizontal direction by a horizontal direction component of the inertial force of the suspended cargo 250. In addition, when the boom 230 is expanded/contracted and the expanding/contracting motion is stopped suddenly, the suspended cargo 250 is swung like the pendulum in the horizontal direction by the horizontal direction component of the inertial force of the suspended cargo 250.

The slow stopping apparatus 2 according to the present embodiment is used for suppressing the swing of the suspended cargo 250 when stopping the turning, derricking or expanding/contracting motion of the boom 230 in the mobile crane 200.

In the mobile crane 200, the "cargo" described in the claims means the suspended cargo 250 which is suspended from the hook 240, the "weight of a cargo" means a sum of the weight of the hook 240 and that of the suspended cargo 250 (which will be hereinafter referred to as the "weight of the suspended cargo 250"), and the "cargo swing" means a swing of the suspended cargo 250.

Next, the structure of the slow stopping apparatus 2 will be described.

Figure 4:
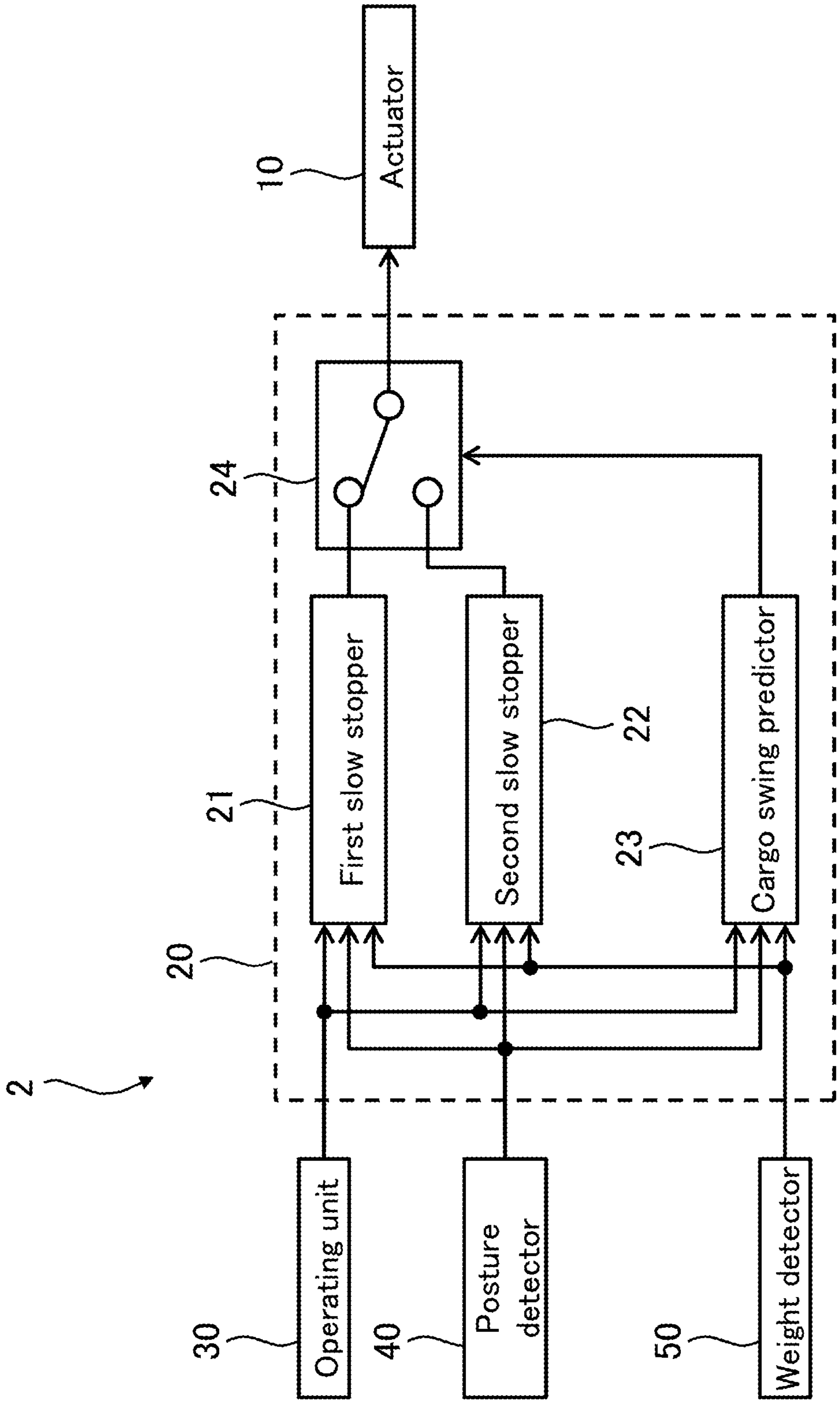
FIG. 4 is a block diagram showing a slow stopping apparatus according to a second embodiment of the present invention.

As shown in FIG. 4, the slow stopping apparatus 2 has a structure in which a weight detector 50 for detecting the weight of the suspended cargo 250 is added to the slow stopping apparatus 1 according to the first embodiment.

In the present embodiment, the actuator 10 is a turning motor for turning the boom 230, a derricking cylinder for derricking the boom 230, or an expanding/contracting cylinder for expanding/contracting the boom 230.

The operating unit 30 includes an operating lever, an operating pedal, a switch and the like which are provided on a driver's seat of the mobile crane 200. The control unit 20 controls a driving speed of the actuator 10 in accordance with an operating amount of the operating unit 30 (an amount of inclination of the operating lever). In the case in which the operating unit 30 is not operated (the operating amount is 0), moreover, a stop signal for giving an instruction to stop the motion of the boom 230 is input from the operating unit 30 to the control unit 20.

The posture detector 40 is configured from various sensors for measuring the turning angle, derricking angle and expansion/contraction length of the boom 230 and a distance from a tip of the boom 230 to the suspended cargo 250 (which will be hereinafter referred to as a "suspension distance of the hook 240)". A result of the detection of the posture detector 40 is input to the control unit 20.

The weight detector 50 is configured from various sensors for measuring the weight of the suspended cargo 250. The result of the detection of the weight detector 50 is input to the control unit 20.

The control unit 20 includes first slow stopper 21, second slow stopper 22, cargo swing predictor 23, and switcher 24 and is configured to stop the actuator 10 which is being driven in their cooperation Signals are input from the operating unit 30, the posture detector 40 and the weight detector 50 to the first slow stopper 21. The first slow stopper 21 stops the actuator 10 by the following slow stopping method when inputting a stop signal for giving an instruction to stop the motion of the boom 230 from the operating unit 30.

First of all, the first slow stopper 21 calculates a cargo swing cycle T of the suspended cargo 250 based on the results of the detection of the posture detector 40 and the weight detector 50 when inputting the stop signal from the operating unit 30. Herein, the cargo swing cycle T represents a cycle of a natural vibration of the suspended cargo 250 which is generated when the motion of the boom 230 is stopped suddenly. It is known that the cargo swing cycle T of the suspended cargo 250 is uniquely determined by the posture of the boom 230 (the derricking angle and the expansion/contraction length), the suspension distance of the hook 240 and the weight of the suspended cargo 250.

The first slow stopper 20 has a structure in which information such as a dead weight, a structure or a rigidity about the boom 230 is prestored and the cargo swing cycle T is dynamically calculated based on the information and the results of the detection of the posture detector 40 and the weight detector 50 (the posture of the boom 230, the suspension distance of the hook 240 and the weight of the suspended cargo 250).

Moreover, it is also possible to employ a structure in which the cargo swing cycles T for the postures of the boom 230, the suspension distances of the hook 240 and the weights of the suspended cargo 250 are previously obtained by a test and are stored in the first slow stopper 21, and the first slow stopper 21 calls the cargo swing cycle T corresponding to the results of the detection of the posture detector 40 and the weight detector 50 from the cargo swing cycles T for the postures of the boom 230, the suspension distances of the hook 240 and the weights of the suspended cargo 250 which are stored.

Next, the first slow stopper 21 outputs a control signal in order to take a time T1 (=T/2) in a half of the calculated cargo swing cycle T, thereby braking and stopping the actuator 10.

The second slow stopper 22 inputs signals from the operating unit 30, the posture detector 40 and the weight detector 50. The second slow stopper 22 stops the actuator 10 by the same slow stopping methods as the second slow stopper 22 according to the first embodiment when inputting the stop signal from the operating unit 30.

Herein, the time T2 is set to be shorter than the time T1 in the half of the cargo swing cycle T. For this reason, when the actuator 10 is stopped by the second slow stopper 22, the cargo swing occurs corresponding to a shorter portion than the time T1. A value of the time T2 is predetermined by a test. More specifically, times required for the stop are obtained to cause the load amplitude to fall within a predetermined range for the postures of the boom 130, the suspension distances of the hook 240 and the weights of the suspended cargo 250, and are set to be the times T2.

The second slow stopper 22 calls the time T2 corresponding to the results of the detection of the posture detector 40 and the weight detector 50 from the times T2 for the postures of the boom 130, the suspension distances of the hook 240 and the weights of the suspended cargo 250 which are stored, and takes the time T2 to output a control signal in order to stop the actuator 10.

The time T2 may be determined as a constant value regardless of the posture of the boom 130, the suspension distance of the hook 240 and the weight of the suspended cargo 250. In this case, the results of the detection of the posture detector 40 and the weight detector 50 are not input to the second slow stopper 22. The second slow stopper 22 outputs a control signal so as to take the prestored time T2, thereby stopping the actuator 10 regardless of the posture of the boom 130, the suspension distance of the hook 240 and the weight of the suspended cargo 250.

The cargo swing predictor 23 inputs signals from the operating unit 30, the posture detector 40 and the weight detector 50. The cargo swing predictor 23 predicts whether the load amplitude in the sudden stop of the motion of the boom 230 would exceed an allowable value based on the operating amount of the operating unit 30 and the results of the detection of the posture detector 40 and the weight detector 50. In the present embodiment, the cargo swing predictor 23 carries out prediction by the following method.

First of all, the cargo swing predictor 23 calculates the load amplitude A of the suspended cargo 250 based on the operating amount of the operating unit 30 and the results of the detection of the posture detector 40 and the weight detector 50. It is known that the load amplitude A of the suspended cargo 250 is determined by the posture of the boom 230 (the derricking angle and the expansion/contraction length), the suspension distance of the hook 240, the motion speed of the boom 230 and the weight of the suspended cargo 250.

In the present embodiment, the motion speed of the boom 230 is acquired from the operating amount of the operating unit 30. The motion speed of the boom 230 may be calculated based on a time change in the result of the detection of the posture detector 40 (the posture of the boom 230). Moreover, a speed detector for detecting the motion speed of the boom 230 may be provided in addition to the operating unit 30.

The cargo swing predictor 23 has a structure in which information such as a structure or a rigidity about the boom 230 is prestored and the load amplitude A is dynamically calculated based on the information, the operating amount of the operating unit 30 (the motion speed of the boom 230), the results of the detection of the posture detector 40 and the weight detector 50 (the posture of the boom 230, the suspension distance of the hook 240 and the weight of the suspended cargo 250).

Moreover, it is also possible to employ a structure in which the load amplitudes A for the postures of the boom 230, the suspension distances of the hook 240, the motion speeds of the boom 230 and the weights of the suspended cargo 250 are previously obtained by a test and are stored in the cargo swing predictor 23, and the cargo swing predictor 23 calls the load amplitude A corresponding to the operating amount of the operating unit 30 and the results of the detection of the posture detector 40 and the weight detector 50 from the load amplitudes A for the postures of the boom 230, the suspension distances of the hook 240, the motion speeds of the boom 230 and the weights of the suspended cargo 250 which are stored.

Next, the cargo swing predictor 23 decides that the load amplitude A would exceed an allowable value when the calculated load amplitude A exceeds a prestored threshold, and decides that the load amplitude A would not exceed the allowable value when the calculated load amplitude A does not exceed the threshold.

Herein, the threshold is predetermined as an allowable maximum value of the load amplitude A. For example, the threshold is determined as a maximum value of the load amplitude A with which the cargo swing of the suspended cargo 250 can be ensured safely.

The switcher 24 outputs the control signal of the first slow stopper 21 to the actuator 10 to stop the actuator 10 by the first slow stopper 21 when the cargo swing predictor 23 predicts that the load amplitude A would exceed an allowable value. Moreover, the switcher 24 outputs the control signal of the second slow stopper 22 to the actuator 10, thereby stopping the actuator 10 by the second slow stopper 22 when the cargo swing predictor 23 predicts that the load amplitude A would not exceed the allowable value.

Next, the motion of the slow stopping apparatus 2 will be described.

As shown in FIG. 2, when the worker operates the operating unit 30 to change the operating amount of the operating unit 30 from p to 0 (the non-operation state) at the time t (FIG. 2(*a*)), the first slow stopper 21 outputs the control signal to take the time T1 in the half of the cargo swing cycle T, thereby stopping the actuator 10 (FIG. 2(*b*)). On the other hand, the second slow stopper 22 outputs the control signal to take the shorter time T2 than the time T1, thereby stopping the actuator 10 (FIG. 2(*c*)). Moreover, the cargo swing predictor 23 predicts whether the load amplitude A would exceed the allowable value based on the operating amount p of the operating unit 30 just before a sudden stop and the results of the detection of the posture detector 40 and the weight detector 50.

In the case in which the expansion/contraction length of the boom 230 is great, the case in which the motion speed of the boom 230 is high, the case in which the suspension distance of the hook 240 is great or the case in which the weight of the suspended cargo 250 is great, the cargo swing predictor 23 predicts that the load amplitude A would exceed the allowable value. In this case, the switcher 24 outputs the control signal of the first slow stopper 21 to the actuator 10 to stop the actuator 10 by the first slow stopper 21. For this reason, it is possible to suppress the cargo swing in the stop of the motion of the boom 230.

On the other hand, in the case in which the expansion/contraction length of the boom 230 is small, the case in which the motion speed of the boom 230 is low, the case in which the suspension distance of the hook 240 is short or the case in which the weight of the suspended cargo 250 is small, the cargo swing predictor 23 predicts that the load amplitude A would not exceed the allowable value. In this case, the switcher 24 outputs the control signal of the second slow stopper 22 to the actuator 10 to stop the actuator 10 by the second slow stopper 22. For this reason, it is possible to shorten a time required for stopping the motion of the boom 230. In addition, it is predicted that the load amplitude A would not exceed the allowable value. Even if the actuator

10 is stopped by the second slow stopper 22, therefore, it is possible to control the load amplitude A to fall within an allowable range.

As described above, according to the slow stopping apparatus 2, it is possible to shorten the stopping time while suppressing the cargo swing.

Moreover, the cargo swing predictor 23 according to the present embodiment predicts the load amplitude A based on the operating amount of the operating unit 30 (the motion speed of the boom 230), the result of the detection of the posture detector 40 (the posture of the boom 230 and the suspension distance of the hook 240) and the weight of the suspended cargo 250, and predicts whether the allowable value would be exceeded based on the load amplitude A in the case in which the motion of the boom 230 having the hook 240 is stopped. Consequently, it is possible to accurately predict the cargo swing. Therefore, it is possible to properly switch the first slow stopper 21 and the second slow stopper 22, and to shorten the stopping time while suppressing the cargo swing reliably.

Third Embodiment

Next, a slow stopping apparatus 3 according to a third embodiment of the present invention will be described.

In a mobile crane 200, a cargo swing is generated also in the case in which the upward/downward motion of a hook 240 is stopped in addition to the case of stop of turning, derricking and expanding/contracting motions of the boom 230. In more detail, the hook 240 is moved upward/downward, the boom 230 is flexed by an inertial force of a suspended cargo 250 when the upward/downward movement is stopped suddenly, and the suspended cargo 250 is swung in a perpendicular direction by the flexure. The slow stopping apparatus 3 according to the present embodiment is used for suppressing the swing of the suspended cargo 250 when stopping the upward/downward movement of the hook 240 in the mobile crane 200.

A structure of the slow stopping apparatus 3 is the same as that of the slow stopping apparatus 2 according to the second embodiment (see FIG. 4). In the present embodiment, an actuator 10 is a winch for moving the hook 240 upward/downward.

An operating unit 30 includes an operating lever, an operating pedal, a switch and the like which are provided on a driver's seat of the mobile crane 200. A control unit 20 controls the driving speed of the actuator 10 in accordance with an operating amount of the operating unit 30 (an amount of inclination of the operating lever). In the case in which the operating unit 30 is not operated (the operating amount is 0), moreover, a stop signal for giving an instruction to stop the motion of the hook 240 is input from the operating unit 30 to the control unit 20.

Signals are input from the operating unit 30, a posture detector 40 and a weight detector 50 to a first slow stopper 21. The first slow stopper 21 stops the actuator 10 by the following slow stopping method when inputting a stop signal for giving an instruction to stop the motion of the hook 240 from the operating unit 30.

First of all, the first slow stopper 21 calculates a cargo swing cycle T of the suspended cargo 250 based on results of detection of the posture detector 40 and the weight detector 50 when inputting the stop signal from the operating unit 30. Herein, the cargo swing cycle T represents a cycle of a natural vibration of the suspended cargo 250 which is generated when the motion of the hook 240 is stopped suddenly. It is known that the cargo swing cycle T of the suspended cargo 250 is uniquely determined by the posture of the boom 230 (the derricking angle and the expansion/contraction length) and the weight of the suspended cargo 250. The first slow stopper 21 has such a structure as to dynamically calculate the cargo swing cycle T or to call the prestored cargo swing cycle T.

Next, the first slow stopper 21 outputs a control signal in order to take a time T1 (=T/2) in a half of the calculated cargo swing cycle T, thereby braking and stopping the actuator 10.

Signals are input from the operating unit 30, the posture detector 40 and the weight detector 50 to a second slow stopper 22. The second slow stopper 22 stops the actuator 10 by the same slow stopping method the second slow stopper 22 according to the first embodiment when inputting the stop signal from the operating unit 30.

Herein, the time T2 is set to be shorter than the time T1 in the half of the cargo swing cycle T. For this reason, when the actuator 10 is stopped by the second slow stopper 22, the cargo swing occurs corresponding to a shorter portion than the time T1. A value of the time T2 is predetermined by a test. More specifically, times required for the stop are obtained to cause the load amplitude to fall within a predetermined range for each posture of a boom 130 and each weight of the suspended cargo 250, and are set to be the times T2.

The second slow stopper 22 calls the time T2 corresponding to the results of the detection of the posture detector 40 and the weight detector 50 from the times T2 for the postures of the boom 130 and the weights of the suspended cargo 250 which are stored, and outputs a control signal to take the time T2, thereby stopping the actuator 10.

The time T2 may be determined as a constant value regardless of the posture of the boom 130 and the weight of the suspended cargo 250. In this case, the results of the detection of the posture detector 40 and the weight detector 50 are not input to the second slow stopper 22. The second slow stopper 22 outputs a control signal so as to take the prestored time T2, thereby stopping the actuator 10 regardless of the posture of the boom 130 and the weight of the suspended cargo 250.

The cargo swing predictor 23 inputs signals from the operating unit 30, the posture detector 40 and the weight detector 50. The cargo swing predictor 23 predicts whether the load amplitude in the sudden stop of the motion of the hook 240 would exceed an allowable value based on the operating amount of the operating unit 30 and the results of the detection of the posture detector 40 and the weight detector 50. In the present embodiment, the cargo swing predictor 23 carries out prediction by the following method.

First of all, the cargo swing predictor 23 calculates a load amplitude A of the suspended cargo 250 based on the operating amount of the operating unit 30 and the results of the detection of the posture detector 40 and the weight detector 50. It is known that the load amplitude A of the suspended cargo 250 is determined by the posture of the boom 230 (the derricking angle and the expansion/contraction length), the motion speed of the boom 230 and the weight of the suspended cargo 250. The cargo swing predictor 23 has such a structure as to dynamically calculate the load amplitude A or to call the prestored load amplitude A.

In the present embodiment, the motion speed of the hook 240 is acquired from the operating amount of the operating unit 30. The motion speed of the hook 240 may be calculated based on a time change in the result of the detection of the posture detector 40 (the suspension distance of the hook 240). Moreover, a speed detector for detecting the motion speed of the hook 240 may be provided in addition to the operating unit 30.

Next, the cargo swing predictor 23 decides that the load amplitude A would exceed an allowable value when the calculated load amplitude A exceeds a prestored threshold, and decides that the load amplitude A would not exceed the allowable value when the calculated load amplitude A does not exceed the threshold.

The switcher 24 outputs the control signal of the first slow stopper 21 to the actuator 10 to stop the actuator 10 by the first slow stopper 21 when the cargo swing predictor 23 predicts that the load amplitude A would exceed an allowable value. Moreover, the switcher 24 outputs the control signal of the second slow stopper 22 to the actuator 10, thereby stopping the actuator 10 by the second slow stopper 22 when the cargo swing predictor 23 predicts that the load amplitude A would not exceed the allowable value.

Next, the motion of the slow stopping apparatus 2 will be described.

As shown in FIG. 2, when a worker operates the operating unit 30 to change the operating amount of the operating unit 30 from p to 0 (a non-operation state) at the time t (FIG. 2 (*a*)), the first slow stopper 21 outputs a control signal in order to take a time T1 in the half of the cargo swing cycle T, thereby stopping the actuator 10 (FIG. 2 (*b*)). On the other hand, the second slow stopper 22 outputs the control signal in order to take the shorter time T2 than the time T1, thereby stopping the actuator 10 (FIG. 2 (*c*)). Moreover, the cargo swing predictor 23 predicts whether the load amplitude A would exceed the allowable value based on the operating amount p of the operating unit 30 just before a sudden stop and the results of the detection of the posture detector 40 and the weight detector 50.

In the case in which the expansion/contraction length of the boom 230 is great, the case in which the motion speed of the hook 240 is high or the case in which the weight of the suspended cargo 250 is great, the cargo swing predictor 23 predicts that the load amplitude A would exceed the allowable value. In this case, the switcher 24 outputs the control signal of the first slow stopper 21 to the actuator 10 to stop the actuator 10 by the first slow stopper 21. For this reason, it is possible to suppress the cargo swing in the stop of the motion of the boom 230.

On the other hand, in the case in which the expansion/contraction length of the boom 230 is small, the case in which the motion speed of the hook 240 is low or the case in which the weight of the suspended cargo 250 is small, the cargo swing predictor 23 predicts that the load amplitude A would not exceed the allowable value. In this case, the switcher 24 outputs the control signal of the second slow stopper 22 to the actuator 10 to stop the actuator 10 by the second slow stopper 22. For this reason, it is possible to shorten a time required for stopping the motion of the boom 230. In addition, it is predicted that the load amplitude A would not exceed the allowable value. Even if the actuator 10 is stopped by the second slow stopper 22, therefore, it is possible to control the load amplitude A to fall within an allowable range.

As described above, according to the slow stopping apparatus 3, it is possible to shorten the stopping time while suppressing the cargo swing.

Moreover, the cargo swing predictor 23 according to the present embodiment predicts the load amplitude A based on the operating amount of the operating unit 30 (the motion speed of the hook 240), the result of the detection of the posture detector 40 (the posture of the boom 230) and the weight of the suspended cargo 250, and predicts whether the allowable value would be exceeded based on the load amplitude A in the case in which the motion of the hook 240 is stopped. Consequently, it is possible to accurately predict the cargo swing. Therefore, it is possible to properly switch the first slow stopper 21 and the second slow stopper 22, and to shorten the stopping time while suppressing the cargo swing reliably.

Fourth Embodiment

Next, a slow stopping apparatus 4 according to a fourth embodiment of the present invention will be described.

The slow stopping apparatus 4 according to the present embodiment has a configuration in which a predicting method of cargo swing predictor 23 is different from that in each of the embodiments described above. Since the other structures are the same as those of the slow stopping apparatus 1, 2 or 3 according to the first, second or third embodiment, description will be omitted.

The cargo swing predictor 23 according to the present embodiment decides that a load amplitude A would exceed an allowable value when an operating amount p of the operating unit 30 just before a sudden stop (a motion speed of a boom 130 or 230 or a hook 240) exceeds a threshold, and decides that the load amplitude A would not exceed the allowable value when the operating amount p of the operating unit 30 just before a sudden stop does not exceed the threshold. Herein, the thresholds are predetermined for each posture of the boom 130 or 230, suspension distances of the hook 240 (the case in which the boom 230 having the hook 240 is stopped) and weights of a cargo (a bucket 140 or a suspended cargo 250). In other words, the cargo swing predictor 23 calls a threshold corresponding to results of detection of a posture detector 40 and a weight detector 50 from thresholds for the postures of the boom 130 or 230, the suspension distances of the hook 240 (the case in which the boom 230 having the hook 240 is stopped) and weights of cargos 140 and 250 which are stored, and compares the threshold with the operating amount p of the operating unit 30 just before a sudden stop to decide whether the load amplitude A would exceed an allowable value.

The threshold may be determined for each weight of the cargos 140 and 250 regardless of the posture of the boom 130 or 230 or the suspension distance of the hook 240. In this case, the result of the detection of the posture detector 40 is not input to the cargo swing predictor 23. The cargo swing predictor 23 calls a threshold corresponding to the result of the detection of the weight detector 50 from the thresholds for the weights of the cargos 140 and 250 which are stored, and compares the threshold with the operating amount p of the operating unit 30 just before a sudden stop, thereby deciding whether the load amplitude A would exceed the allowable value.

Moreover, the thresholds may be determined for the postures of the booms 130 and 230 and the suspension distances of the hook 240 (the case in which the boom 230 having the hook 240 is stopped) regardless of each of the weights of the cargos 140 and 250. In this case, the result of the detection of the weight detector 50 is not input to the cargo swing predictor 23. The cargo swing predictor 23 calls a threshold corresponding to the result of the detection of the posture detector 40 from the thresholds for the postures of the booms 130 and 230 and the suspension distances of the hook 240 (the case in which the boom 230 having the hook 240 is stopped) which are stored, and compares the threshold with the operating amount p of the operating unit 30 just before a sudden stop, thereby deciding whether the load amplitude A would exceed the allowable value.

Furthermore, the threshold may be determined as a constant value regardless of each of the postures of the booms 130 and 230, the suspension distances of the hook 240 and the weights of the cargos 140 and 250. In this case, the results of the detection of the posture detector 40 and the weight detector 50 are not input to the cargo swing predictor 23. The cargo swing predictor 23 compares the prestored threshold with the operating amount p of the operating unit 30 just before a sudden stop regardless of each of the postures of the booms 130 and 230, the suspension distance of the hook 240, and the weights of the cargos 140 and 250, thereby deciding whether the load amplitude A would exceed the allowable value.

By comparison of the operating amount p of the operating unit 30 just before a sudden stop with the threshold as described above, it is predicted whether the load amplitude A would exceed the allowable value. For this reason, the first slow stopper 21 and the second slow stopper 22 are switched based on the motion speeds of the booms 130 and 230. Therefore, a worker can predict either of the slow stopper 21 and 22 by which the boom 130 or 230 is stopped. Thus, operability can be improved.

In place of the operating amount p of the operating unit 30 just before a sudden stop, it is also possible to use a result of detection of a speed detector for detecting the motion speed of the boom 130 or 230 or the hook 240. It is also possible to calculate the motion speed of the boom 230 or the hook 240 based on a time change in the result of the detection of the posture detector 40 (the posture of the boom 230 or the suspension distance of the hook 240).

Fifth Embodiment

Next, a slow stopping apparatus 5 according to a fifth embodiment of the present invention will be described.

In the embodiments, the cargo swing predictor 23 may be configured in the following manner.

The cargo swing predictor 23 decides that a load amplitude A would exceed an allowable value when a result of detection of a posture detector 40 exceeds a threshold, and decides that the load amplitude A would not exceed the allowable value when the result of the detection of the posture detector 40 does not exceed the threshold. Herein, the threshold is predetermined for each motion speed of a boom 130 or 230 or a hook 240 and each weight of a cargo 140 or 250. In other words, the cargo swing predictor 23 calls a threshold corresponding to an operating amount p of the operating unit 30 just before a sudden stop (the motion speed of the boom 130 or 230 or the hook 240) and a result of detection of a weight detector 50, and compares the threshold with the result of the detection of the posture detector 40, thereby deciding whether the load amplitude A would exceed the allowable value.

The threshold may be determined for each of the weights of the cargos 140 and 250 regardless of the motion speed of the boom 130 or 230 or the hook 240. In this case, the operating amount of the operating unit 30 is not input to the cargo swing predictor 23. The cargo swing predictor 23 calls a threshold corresponding to the result of the detection of the weight detector 50 from the thresholds for the weights of the cargos 140 and 250 which are stored, and compares the threshold with the result of the detection of the posture detector 40, thereby deciding whether the load amplitude A would exceed the allowable value.

Moreover, the threshold may be determined for each motion speed of the boom 130 or 230 or the hook 240 regardless of the weight of the cargo 140 or 250. In this case, the result of the detection of the weight detector 50 is not input to the cargo swing predictor 23. The cargo swing predictor 23 calls a threshold corresponding to the operating amount p of the operating unit 30 just before a sudden stop (the motion speed of the boom 130 or 230 or the hook 240) from the thresholds for the motion speed of the boom 130 or 230 or the hook 240 which are stored, and compares the threshold with the result of the detection of the posture detector 40, thereby deciding whether the load amplitude A would exceed the allowable value.

Furthermore, the threshold may be determined as a constant value regardless of the motion speed of the boom 130 or 230 or the hook 240 and the weight of the cargo 140 or 250. In this case, neither the operating amount of the operating unit 30 nor the result of the detection of the weight detector 50 are input to the cargo swing predictor 23. The cargo swing predictor 23 compares the prestored threshold with the result of the detection of the posture detector 40 regardless of the motion speed of the boom 130 or 230 or the hook 240 and the weight of the cargo 140 or 250, thereby deciding whether the load amplitude A would exceed the allowable value.

By comparison of the result of the detection of the posture detector 40 with the threshold as described above, it is predicted whether the load amplitude A would exceed the allowable value. For this reason, the first slow stopper 21 and the second slow stopper 22 are switched based on the posture of the boom 130 or 230. Therefore, a worker can predict either of the slow stopper 21 and 22 by which the boom 130 or 230 or the hook 240 is stopped. Thus, operability can be improved.

Sixth Embodiment

Next, a slow stopping apparatus 6 according to a sixth embodiment of the present invention will be described.

In the embodiments, the cargo swing predictor 23 may be configured in the following manner.

The cargo swing predictor 23 decides that a load amplitude A would exceed an allowable value when a result of detection of a weight detector 50 exceeds a threshold, and decides that the load amplitude A would not exceed the allowable value when the result of the detection of the weight detector 50 does not exceed the threshold. Herein, the threshold is predetermined for each posture of a boom 130 or 230, each suspension distance of a hook 240 (the case in which the boom 230 having the hook 240 is stopped), and each motion speed of the boom 130 or 230 or the hook 240. In other words, the cargo swing predictor 23 calls a threshold corresponding to a result of detection of a posture detector 40 and an operating amount p of the operating unit 30 just before a sudden stop (the motion speed of the boom 130 or 230 or the hook 240) from thresholds for the postures of the boom 130 or 230, the suspension distances of the hook 240 (the case in which the boom 230 having the hook 240 is stopped) and the motion speeds of the boom 130 or 230 or the hook 240 which are stored, and compares the threshold with the result of the detection of the weight detector 50, thereby deciding whether the load amplitude A would exceed the allowable value.

The threshold may be determined for each motion speed of the boom 130 or 230 or the hook 240 regardless of the posture of the boom 130 or 230 or the suspension distance of the hook 240. In this case, the result of the detection of the posture detector 40 is not input to the cargo swing predictor 23. The cargo swing predictor 23 calls a threshold corresponding to the operating amount p of the operating unit 30 just before a sudden stop (the motion speed of the boom 130 or 230 or the hook 240) from the thresholds for the motion speeds of the boom 130 or 230 or the hook 240 which are stored, and compares the threshold with the result of the detection of the weight detector 50, thereby deciding whether the load amplitude A would exceed the allowable value.

Moreover, the threshold may be determined for each posture of the boom 130 or 230 and each suspension distance of the hook 240 (the case in which the boom 230 having the hook 240 is stopped) regardless of the motion speed of the boom 130 or 230 or the hook 240. In this case, the operating amount of the operating unit 30 is not input to the cargo swing predictor 23. The cargo swing predictor 23 calls a threshold corresponding to the result of the detection of the posture detector 40 from the thresholds for the postures of the booms 130 and 230 and the suspension distances of the hook 240 which are stored (the case in which the boom 230 having the hook 240 is stopped), and compares the threshold with the result of the detection of the weight detector 50, thereby deciding whether the load amplitude A would exceed the allowable value.

Furthermore, the threshold may be determined as a constant value regardless of the posture of the boom 130 or 230, the suspension distance of the hook 240, and the motion speed of the boom 130 or 230 or the hook 240. In this case, the result of the detection of the posture detector 40 and the operating amount of the operating unit 30 are not input to the cargo swing predictor 23. The cargo swing predictor 23 compares the prestored threshold with the result of the detection of the weight detector 50 regardless of the posture of the boom 130 or 230, the suspension distance of the hook 240 and the motion speed of the boom 130 or 230 or the hook 240, thereby deciding whether the load amplitude A would exceed the allowable value.

By comparison of the result of the detection of the weight detector 50 with the threshold as described above, it is predicted whether the load amplitude A would exceed the allowable value. For this reason, the first slow stopper 21 and the second slow stopper 22 are switched based on the weights of the cargos 140 and 250. Therefore, a worker can predict either of the slow stopper 21 and 22 by which the boom 130 or 230 or the hook 240 is stopped. Thus, operability can be improved.

Other Embodiments

In combination of the structures according to the fourth, fifth and sixth embodiments, furthermore, the cargo swing predictor 23 may be configured to decide whether the load amplitude A would exceed the allowable value by comparing the operating amount p of the operating unit 30 just before a sudden stop (the motion speed of the boom 130 or 230 or the hook 240), the results of the detection of the posture detector 40 and the weight detector 50 and the prestored threshold.

In the fifth and sixth embodiments, moreover, it is also possible to use a result of detection of a speed detector for detecting the motion speed of the boom 130 or 230 or the hook 240 in place of the operating amount p of the operating unit 30 just before a sudden stop. The motion speed of the boom 230 or the hook 240 may be calculated based on a time change in the result of the detection of the posture detector 40 (the posture of the boom 230 or the suspension distance of the hook 240).

In each of the embodiments, moreover, it is also possible to provide a display for displaying the first slow stopper 21 or the second slow stopper 22 which slowly stops the actuator 10. The display preferably has a structure in which the display is switched based on the result of the prediction of the cargo swing predictor 23.

EXPLANATION OF DESIGNATION

1, 2 slow stopping apparatus
10 actuator
20 control unit
21 first slow stopper
22 second slow stopper
23 cargo swing predictor
24 switcher
30 operating unit
40 posture detector
50 weight detector
100 aerial work platform
110 vehicle
120 slewing table
130 boom
140 bucket
200 mobile crane
210 running vehicle body
220 slewing table
230 boom
240 hook
241 wire rope
250 suspended cargo

The invention claimed is:

1. A slow stopping apparatus for a working machine, wherein the slow stopping apparatus is provided in the working machine, and the working machine includes a boom for supporting a cargo, the slow stopping apparatus comprising:

an actuator, wherein the actuator operates the working machine;

a control unit, wherein the control unit controls a driving motion of the actuator; and an operating unit, wherein the operating unit gives an instruction to operate the working machine to the control unit, wherein the control unit includes:

a first slow stopper, wherein the first slow stopper calculates a cargo swing cycle (T) of the cargo, and brakes and stops the actuator when a stop signal is input from the operating unit to stop a motion of the working machine, and time to brake and stop the actuator is half the cargo swing cycle (T/2);

a second slow stopper, wherein the second slow stopper brakes and stops the actuator when the stop signal is input from the operating unit, and the time to brake and stop the actuator is less than half the cargo swing cycle (T/2);

a cargo swing predictor, wherein the cargo swing predictor predicts whether a load amplitude of the cargo will exceed an allowable value; and a switcher, wherein the switcher stops the actuator with the first slow stopper when the cargo swing predictor predicts that the load amplitude of the cargo will exceed the allowable value, and stops the actuator with the second slow stopper when the cargo swing predictor predicts that the load amplitude of the cargo will not exceed the allowable value.

2. The slow stopping apparatus for a working machine according to claim 1, wherein the first slow stopper calculates: the cargo swing cycle (T) of the cargo, and stopping time to brake and stop the actuator when the stop signal is input to stop a motion of the boom, the stopping time to brake and stop the actuator is half the cargo swing cycle (T/2), and the cargo swing cycle (T) is based on a posture of the boom, and a weight of the cargo.

3. The slow stopping apparatus for a working machine according to claim 1, wherein the working machine includes a hook suspended from the boom for hanging the cargo thereon, the first slow stopper calculates: the cargo swing cycle (T) of the cargo; and stopping time to brake and stop the actuator when the stop signal is input to stop a motion of the boom, the stopping time to brake and stop the actuator is half the cargo swing time (T/2), and the cargo swing cycle (T) is based on a posture of the boom, a suspension distance of the hook, and a weight of the cargo.

4. The slow stopping apparatus for a working machine according to claim 1, wherein the working machine includes a hook suspended from the boom for hanging the cargo thereon, the first slow stopper calculates: the cargo swing cycle (T) of the cargo; and stopping time to brake and stop the actuator when the stop signal is input to stop a motion of the hook, the stopping time to brake and stop the actuator is half the cargo swing time (T/2), and the cargo swing cycle (T) is based on a posture of the boom and a weight of the cargo.

5. The slow stopping apparatus for a working machine according to claim 1, wherein the cargo swing predictor calculates a load amplitude of the cargo based on a posture of the boom, a motion speed of the boom, and a weight of the cargo, and the cargo swine predictor determines:

1) that the load amplitude of the cargo will exceed the allowable value when the load amplitude exceeds a threshold; and 2) that the load amplitude of the cargo will not exceed the allowable value when the load amplitude does not exceed the threshold.

6. The slow stopping apparatus for a working machine according to claim 1, wherein the working machine includes a hook suspended from the boom for hanging the cargo thereon, and the cargo swing predictor calculates a load amplitude of the cargo based on a posture of the boom, a suspension distance of the hook, a motion speed of the boom, and a weight of the cargo, and the cargo swing predictor determines:

1) that the load amplitude of the cargo will exceed the allowable value when the load amplitude exceeds a threshold; and 2) that the load amplitude of the cargo will not exceed the allowable value when the load amplitude does not exceed the threshold.

7. The slow stopping apparatus for a working machine according to claim 1, wherein the working machine includes a hook suspended from the boom for hanging the cargo thereon, and the cargo swing predictor calculates a load amplitude of the cargo based on a posture of the boom, a motion speed of the hook, and a weight of the cargo, and the cargo swing predictor determines:

1) that the load amplitude of the cargo will exceed the allowable value when the load amplitude exceeds a threshold; and 2) that the load amplitude of the cargo will not exceed the allowable value when the load amplitude does not exceed the threshold.

8. The slow stopping apparatus for a working machine according to claim 1, further comprising a speed detector, wherein the speed detector detects a motion speed of the working machine, and wherein the cargo swing predictor determines:

1) that the load amplitude of the cargo will exceed the allowable value when the speed detector detects that the motion speed exceeds a threshold; and 2) that the load amplitude of the cargo will not exceed the allowable value when the result of the detection of the speed detector does not exceed the threshold.

9. The slow stopping apparatus for a working machine according to claim 1, further comprising a posture detector, which wherein the posture detector detects a posture of the boom, and wherein the cargo swing predictor determines:

1) that the load amplitude of the cargo will exceed the allowable value when the posture detector detects that the posture of the boom exceeds a threshold; and 2) that the load amplitude of the cargo will not exceed the allowable value when the result of the detection of the posture detector does not exceed the threshold.

10. The slow stopping apparatus for a working machine according to claim 1, further comprising a weight detector, wherein the weight detector detects a weight of the cargo, and wherein the cargo swing predictor determines:

1) that the load amplitude of the cargo will exceed the allowable value when the weight detector detects that the weight of the cargo exceeds a threshold; and 2) that the load amplitude of the cargo will not exceed the allowable value when the result of the detection of the weight detector does not exceed the threshold.

* * * * *